3,161,677
PROCESS FOR REDUCTIVE ALKYLATION OF UREA
Rudolph Schlatter, Wilmington, Del., assignor to E. I. du Pont de Nemours and Company, Wilmington, Del., a corporation of Delaware
No Drawing. Filed Apr. 22, 1963, Ser. No. 274,804
7 Claims. (Cl. 260—553)

This invention relates to the preparation of butyl urea and closely related urea derivatives.

Procedures are known for the reductive alkylation of ketones with urea and hydrogen in the presence of a hydrogenation catalyst. However, known procedures are generally characterized by disappointingly low yields of the desired substituted urea. Attempts to improve such procedures by carrying out the alkylation in the presence of ammonia have been found to have the disadvantages of a large amount of undesired by-product formation and a requirement for excessively long reaction times.

I have now discovered an efficient combination of process conditions under which I can react urea and one of a narrow class of ketones to obtain the corresponding substituted urea compound in surprisingly outstanding yield and with little or no formation of unwanted by-products. Furthermore, my process can be carried out in a drastically reduced reaction time.

My process is particularly notable and advantageous in that it can be carried out with great efficiency in the absence of a solvent for the reactants. This feature is highly unusual in reductive alkylation reactions generally and it is quite surprising that my process can be carried out with high yields even in the absence of a solvent medium.

According to my invention, I react urea with a ketone containing from 3 through 9 carbon atoms and having the following formula:

where R is an alkyl radical of 1 through 7 carbon atoms inclusive, $R_1$ is an alkyl radical of 1 through 7 carbon atoms inclusive, with the maximum sum of R plus $R_1$ being 8, and where R and $R_1$ can be joined together to form with the carbon of the carbonyl group in the ketone a saturated hydrocarbon ring of 5 or 6 carbon atoms in the ring. The ring can be unsubstituted or can be substituted with one or more alkyl substituents with the total number of carbons in the ketone not exceeding 8. Methyl, ethyl, propyl and isopropyl groups are included.

Representative ketones within the scope of this invention include acetone, methyl ethyl ketone, diethyl ketone, methyl propyl ketone, di-isopropyl ketone, n-propyl n-butyl ketone, methyl isobutyl ketone, di-isobutyl ketone, methyl isoamyl ketone, ethyl butyl ketone, ethyl amyl ketone, methyl hexyl ketone, cyclopentanone, cyclohexanone, 3-n-propyl-cyclopentanone, 3-methyl cyclohexanone, 2-ethyl-cyclohexanone, and the like.

The urea and the ketone are used in my invention substantially in equal molar amounts, although somewhat more or less than equal molar can readily be tolerated. For example, about 0.5 to about 1.5 moles of urea can be used for each mole of ketone in the reaction.

I have found surprisingly that the amount of ammonia used in my reaction is extremely critical. It is important that the amount of ammonia used shall not exceed about 0.5 mole for each mole of ketone used. Ammonia in excess of this maximum surprisingly causes drastic reduction in yield, increase in by-product formation, and a need for longer reaction times. The lower limit of the amount of ammonia useful in my invention is not as critical but ordinarily amounts of at least about 0.05 mole of $NH_3$ for each mole of ketone will be used. It is preferred to use from 0.1 to 0.3 mole of ammonia for each mole of ketone.

My process is carried out at elevated temperatures and pressures. Temperatures from 80° to 200° C. are suitable with particularly excellent results being obtained between about 100° and 145° C. Hydrogen pressures can vary over a fairly broad range, such as from about 500 to 4000 pounds per square inch gauge of hydrogen pressure, with preferred results obtained within the range from 1000 to 2000 pounds per square inch gauge hydrogen pressure.

Carrying out my reaction under the critical conditions described above produces unexpectedly high yields of the corresponding mono-alkylated urea. Under the preferred conditions referred to described above, there is formed practically no unwanted by-products such as alkyl amine and alkanol derivatives. Furthermore, formation of intolerably high amounts of di-alkylated urea products is avoided in my process.

By carrying out the above reaction conditions, I found that the process is substantially complete in an extremely short time. Reaction times of the order of 1 to 30 minutes are all that are needed to complete the reaction with excellent yields, although times of 100 minutes are satisfactory. In fact, the selection of one minute as the lower end of the reaction period range is more dictated by convenience of operation of pressure equipment than anything else, as will be readily understood. While the upper limit for the reaction period is not particularly critical, times in excess of three hours can tend to the formation of relatively larger amounts of unwanted by-products, especially the dialkylated derivatives. Preferred reaction times are from 1 to 60 minutes.

My process as mentioned above will be carried out in the presence of a suitable hydrogenation catalyst. The selection of the particular catalyst is not critical and any member of a group of materials known as "hydrogenation catalysts" having the requisite activity under the conditions of the process can be advantageously employed. The catalyst will be employed in a catalytic amount and ordinarily this will be less than about 20% by weight that of the ketone utilized and preferably less than 10% by weight. Perfectly satisfactory results are ordinarily obtained in the range from about 1 to 5% by weight of catalyst.

As just mentioned, the selection of the catalyst is not particularly critical. Illustrative of "hydrogenation catalysts" can be mentioned metals such as nickel, iron, cobalt, copper; precious metals such as platinum, palladium, ruthenium, rhodium, osmium, and the like; and these can be in a finely divided state individually or as mixtures or deposited on a suitable carrier such as alumina, silica, activated carbon, kieselguhr, or the like. Particularly suitable catalysts are the oxides, suboxides, sulfides and subsulfides of the foregoing metals, and others including tungsten, molybdenum, and cerium promoted with zirconium, thorium, silica, aluminum, and the like. Mixtures of two or more of these metal oxides, suboxides, sulfides or subsulfides, or one or more metal oxides, suboxides, sulfides, or subsulfides, with one or more metals are useful as catalysts and components of catalyst mixtures, either supported or unsupported.

I prefer to use promoted nickel or cobalt catalysts, preferably on a kieselguhr support containing 1–5% zirconium. These preferred catalysts are commercially available and highly efficient. If needed, they can conveniently be activated by introducing a small amount of water onto the catalyst in known fashion.

I have found that the manner in which the catalyst is added can have an effect on yield. If the catalyst is slurried in the reaction mass at ambient temperature and the mixture is heated to reaction temperature under hydrogen pressure, high yields are obtained. Surprisingly, even higher yields are obtained when the catalyst is not introduced until the urea, ketone and ammonia have been heated to the desired temperature in the presence of hydrogen.

This invention will be better understood by reference to the following illustrative examples wherein parts and percentages are by weight and yields are based on urea unless otherwise indicated.

*Example 1*

A mixture of 1 mole of urea (60 grams), 1 mole of methyl ethyl ketone (72 grams), 2.5 grams of promoted 50% nickel, 2% zirconium catalyst on kieselguhr support (Girdler 69 catalyst) and 0.294 mole of liquid ammonia (5 grams) is placed in a 400 cc. capacity stainless steel hydrogenation autoclave equipped with electrical heating jacket and rocking apparatus. Hydrogen is added and the mixture heated to 125–140° C. at a total pressure of about 1500 p.s.i. for 1 hour. The reaction mixture is cooled and removed from the autoclave, dissolved in 100 cc. of water and the catalyst filtered off. The filtrate is allowed to cool and two crystal crops are filtered off. The remaining filtrate is salted with potassium chloride and a third crystal crop recovered. The solids are analyzed by melting point, infrared and gas chromatography. The melting range of the crude products is 148–163° C., and the infrared analyses show clearly sec-butylurea and a trace amount of di-sec-butylurea. Based on quantitative gas chromatography analyses a total of 89.5 grams of sec-butylurea and 4.3 grams di-sec-butylurea is obtained. The yield of sec-butylurea is 77%.

*Example 2*

Example 1 is repeated except that the catalyst used is 3 grams of 50% cobalt, 2% zirconia catalyst on kieselguhr (Girdler 67 catalyst), with similarly satisfactory results.

*Example 3*

Using the same apparatus and catalyst as in Example 1, 60 grams of urea (1 mole), 5 grams of catalyst, 72 grams of methyl ethyl ketone (1 mole) and 1.7 grams of ammonia (0.1 mole) are charged to the autoclave and reacted at a hydrogen pressure of 1400 pounds per square inch gauge. After 30 minutes reaction at 130° C., hydrogen equivalent to approximately 900 pounds per square inch gauge is absorbed and 137 grams of reaction mixture is discharged from the autoclave. The solids are dissolved in 100 cc. of hot water and the catalyst filtered off. Upon cooling and concentration two crystal crops totaling 102 grams are recovered from the filtrate and analyzed as 81.6 grams of sec-butylurea, 7.5 grams of di-sec-butylurea and 13 grams of unreacted urea. The melting point of the crude products is 152–165° C. The yield of sec-butylurea is 70.5%.

*Example 4*

Example 3 is repeated except that a molar equivalent amount of di-isopropyl ketone is used in place of the methyl ethyl ketone to obtain an excellent yield of 1-isopropyl-2-methyl-n-propylurea.

*Example 5*

Using the same apparatus as in Example 1, 60 grams of urea (1 mole), 5 grams of 5% ruthenium–95% alumina catalyst, and 8.5 grams of ammonia (0.50 mole) are placed in the autoclave, heated to 80° C. and pressured with 1000 pounds per square inch gauge of hydrogen. Fifty-eight grams (1 mole) of acetone with a trace amount of water (1 cc.) is added to a 250 cc. stainless steel blowcase connected and valved to the autoclave. Using approximately 1100–1400 pounds per sqaure inch gauge of hydrogen pressure on the blowcase, the acetone is injected into the autoclave in 5 portions over a 30 minute period. The autoclave pressure gradually increases from 500 to 1400 pounds per square inch gauge. During this injection period the bomb temperature increases from 80° C. to 109° C. The contents of the autoclave are then heated to 120° C. and held at this temperature for 30 minutes while maintaining a hydrogen pressure of 1400–1600 pounds per square inch gauge.

After rapid cooling to room temperature the solid reaction mass is dissolved in acetone to allow filtration of the catalyst. The acetone filtrate is vacuum concentrated to near dryness and 80 grams of solid, melting at 100–108° C., is isolated by filtration and drying. Analyses by quantitative gas chromatography show that 64% of the solid is isopropylurea (51.2 grams) and the rest di-isopropylurea and unreacted starting urea. Recrystallization of the crude solids from water yields a solid melting at 134–138° C. and is identified by infrared analysis as isopropylurea. Yield is 50%.

*Example 6*

Using the same apparatus and catalyst as in Example 1, 60 grams of urea (1 mole), 98 grams of cyclohexanone (1 mole), 2.5 grams of the catalyst used in Example 2, 5 grams of ammonia (0.294 mole) and 1 gram of water are charged to the autoclave. Hydrogen pressure of 1400 pounds per square inch gauge is applied at room temperature. After heating to 135° C. for 40 minutes while maintaining a hydrogen pressure of 1400–1600 pounds per square inch gauge, the reaction mass is cooled, the autoclave vented and the mass discharged. The mass is 140 grams of gray solids which is dissolved in 400 cc. of methanol and the catalyst filtered off. The clear filtrate is allowed to cool and several crystal crops are recovered. The first two small crops of crystals contain mainly N,N'-dicyclohexylurea. The main product crop of 100 grams is found of analysis to be crude cyclohexylurea (crude yield 70%). A fraction of the main product sample is recrystallized from 2B alcohol and yields pure cyclohexylurea melting at 202–203° C.

*Example 7*

Example 6 is repeated except that 15 grams of Raney-nickel catalyst is used in place of the catalyst of that example with similarly satisfactory results.

*Example 8*

Example 6 is repeated except that a molar equivalent amount of cyclopentanone is used in place of the cyclohexanone to obtain an excellent yield of cyclopentylurea.

*Example 9*

Example 6 is repeated except that a molar equivalent amount of 3-methyl cyclohexanone is used in place of the cyclohexanone to obtain an excellent yield of 3-methyl-cyclohexylurea.

*Example 10*

A suspension of 180 grams of urea (3 moles) in 27 cc. of water, 216 grams (3 moles) of methyl ethyl ketone, 8 grams of 5% ruthenium–1% alumina–94% silica catalyst, and 15 grams (0.885 mole) of ammonia are charged to a 1000 cc. stirred stainless steel autoclave and reacted at a pressure of 1000 pounds per square inch gauge of hydrogen. After one hour retaction at 100°–112° C. approximately 1100 pounds per square inch gauge of hydrogen are absorbed and the reaction mass cooled to 25° C., diluted with 200 cc. of water and discharged from the autoclave. A 415 gram aliquot of the 750 gram reaction mass is worked up. After filtration of the catalyst, the clear filtrate was allowed to cool. One hundred and sixty-three grams of solids melting at 146°–162° C. are recovered from the filtrate and analyzed. This aliquot product portion contains 127 grams of sec-butylurea and 24.8 grams of N,N'-di-sec-butylurea. The total yield of sec-butylurea is thus 65.8%.

Example 11

Using the same apparatus and catalyst as in Example 1, 60 grams of urea (1 mole), 72 grams (1 mole) of methyl ethyl ketone, 5 grams (0.294 mole) of ammonia, 1 cc. of water and 5 grams of catalyst are charged to the autoclave. Hydrogen is added and the contents heated to 120°–145° C. at a hydrogen pressure of 1400–1500 pounds per square inch gauge for about 15 minutes. After cooling, 136 grams of reaction mass are removed from the autoclave, dissolved in 300 cc. of 2B alcohol, and the catalyst filtered off. The clear alcohol filtrate is vacuum concentrated to near dryness and the residue recrystallized from 400 cc. of water. The clear hot water solution is saturated with potassium chloride. No oil phase separates from the hot water-salt solution, indicating the absence of di-sec-butylurea. The water-salt solution is cooled to room temperature and two crystal crops recovered by filtration. The first product corp, weighing 71 grams, contains 2.4% KCl and melts at 160°–165° C. The small second crystal crop, melting at 168°–170° C., weighs 0.4 grams. Both crystal crops are clearly identified by infrared analyses as sec-butylurea. The yield of sec-butylurea is 60%.

Example 12

Example 11 is repeated except that 12 grams of 47% nickel-2% zirconia-51% kieselguhr is used in place of the catalyst of that example and a molar equivalent amount of methyl isobutyl ketone is used in place of the methyl ethyl ketone to obtain an excellent yield of 1,2,2-trimethyl-n-propylurea.

Example 13

In a continuous process three separate streams are fed to an agitated reactor held at 100°–160° C. and under a hydrogen pressure of 1000–3000 p.s.i. Stream No. 1 contains molten urea at approximately 135° C., stream No. 2 contains a slurry of methyl ethyl ketone and about 3% of the catalyst of Example 1 at 25°–75° C., and stream No. 3 contains liquid ammonia. These 3 streams are metered into the reactor at rates that maintain a constant feed ratio of 1 mole of urea, 1 mole of methyl ethyl ketone and 0.240 mole of ammonia. Average residence time for the reactants is about 15–18 minutes. The reaction product is continuously withdrawn from the reactor by means of a pressure reducing valve into an agitated tank to which sufficient water is continuously fed to dissolve the product, forming a 40–60% solution. A stream of 40–60% solution is continuously withdrawn from the tank and is distilled in a 2-plate column to recover unreacted methyl ethyl ketone. The azeotrope of 89% methyl ethyl ketone and 11% water, boiling at 73°–74° C. is collected from the top of the column and is recycled into stream No. 2 of the process as needed. The hot product solution from the bottom of the still is next passed through a filter press to remove the suspended catalyst. The catalyst, after partial reduction with hydrogen, is recharged to stream No. 2 as needed. The filtered product solution is fed to a drum dryer to remove the water. The dried product analyzes as an excellent yield of sec-butylurea with only minor amounts of N,N'-di-sec-butylurea, urea and water.

Example 14

A mixture of 60 grams (1 mole) of urea, 5 grams of the catalyst of Example 1, 72 grams (1 mole) of methyl ethyl ketone and 8.5 grams (0.5 mole) of ammonia is placed in the apparatus of Example 1. The initial hydrogen pressure of 3000 pounds per square inch gauge is increased to 4000 pounds per square inch gauge when the reaction mixture reaches a temperature of 140° C. after rapid heat-up. After a holdup time of 10 minutes at 140°–150° C., approximately 1050 pounds per square inch gauge of hydrogen is absorbed. The reaction mass is cooled quickly to 100° C. and discharged into 100 cc. of water. The catalyst is filtered from the hot solution and after salting with sodium chloride, 85 grams of solids, melting at 157°–165° C., is recovered and analyzed to be 92% sec butylurea, 5% N,N'-di-sec-butylurea, and 3% unreacted urea. The yield of pure sec-butylurea is 67.5%.

Example 15

A mixture of 90 grams (1.5 mole) of urea, 72 grams (1 mole) of methyl ethyl ketone, 5 grams of cobalt catalyst of Example 2, 1 cc. of water and 8.5 grams (0.5 mole) of ammonia is charged to the autoclave of Example 1 and heated rapidly under an initial hydrogen pressure of 500 pounds per square inch gauge to 200° C. Hydrogen absorption starts at 100° C. and the reaction mass held for 20 minutes at 200° C. and 500 pounds pressure. After cooling to room temperature, the pressure is released and the reaction mass charged with 150 cc. of water. The resulting clear solution is vacuum concentrated to dryness. The dry crude product of 105 grams analyzes as 47% sec-butylurea, 15% N,N'-di-sec-butylurea, and 38% unreacted urea. The yield of sec-butylurea is 42%, based on methyl ethyl ketone.

Example 16

A mixture of 30 grams (0.5 mole) of urea, 72 grams (1 mole) methyl ethyl ketone, 2.5 grams of the catalyst of Example 1, 2 cc. of water and 1.7 grams (0.1 mole) of ammonia is charged to the autoclave of Example 1. Hydrogen pressure of 1500 pounds per square inch gauge is applied at 25° C. and the reaction mixture heated for 45 minutes at 100°–105° C. When hydrogen equivalent to total repressuring of 500 pounds per square inch is absorbed, the reaction mixture is cooled and dissolved in 100 cc. of water. Using a 2-plate distillation column, 36 grams of distillate is collected in the temperature range of 45° to 96° C. and found by analysis to be 80% methyl ethyl ketone, 5% sec-butylalcohol and the remainder water and ammonia. The catalyst is filtered from the contents of the still pot residue and the filtrate salted with potassium chloride. Upon cooling, solids precipitate from the salted filtrate and are filtered and dried. Melting point of the dried solids is 145–155° C. and they are found by analysis to contain 33.5 grams of sec-butylurea, 23.0 grams of N,N'-di-sec-butylurea and trace amounts of urea. The yield of sec-butylurea is 58%.

Example 17

In a semi-continuous process, 510 grams of urea (8.5 moles), 612 grams of methyl ethyl ketone (8.5 moles), 20 grams of the catalyst used in Example 1 and 41.5 grams of ammonia (2.44 moles) are charged to a 0.75 gallon agitated steam-jacketed autoclave and heated to 100°–130° C. in 5 minutes. A second one-gallon steam-jacketed and stirred autoclave connected to the charge clave with a steam chased transfer line is heated to 110°–120° C. Then hydrogen pressure of 200 to 1000 pounds per square inch is applied to the charge clave to allow rapid transfer of the hot reaction mixture to the second autoclave. Immediately following the material transfer, the hydrogen pressure to the second autoclave is increased to a constant 1500–1800 pounds per square inch. The reaction mass is held at a temperature of 115°–120° C. for 30–60 minutes until the hydrogen absorption rate falls below 3 pounds per square inch gauge per minute. The hot reaction mass is then pressured into a third 2–3 gallon autoclave containing 1500 milliliters of water at 60°–80° C. After venting the pressure, the hot reaction product is discharged from the third clave to a still pot equipped with a 2 plate distillation column. By heating to a head temperature of 100° C., approximately 200 grams of distillate is collected, consisting mainly of the azeotrope of unreacted methyl ethyl ketone-water, ammonia and trace amounts of sec-butylalcohol and sec-butylamine. Recovery of unreacted methyl ethyl ketone amounts to 90 grams (1.25 mole) and can be recycled in the process.

The hot product solution from the bottom of the still is passed through a filter to remove the catalyst, which can be regenerated and recycled in the process. The filtered product solution is salted with sodium chloride. Upon cooling and filtration, a product crop of 730 grams of sec-butylurea and 30 grams of di-sec-butylurea is recovered. The yield of sec-butylurea is 74% based on urea and 86% based on methyl ethyl ketone.

Example 18

In a continuous process, catalyst of Example 1 in pellet form is placed as a fixed bed in a heated reaction pressure tube at 110–140° C., equipped with pressure condenser, compressor and recycle system. A hot process stream of urea, methyl ethyl ketone and ammonia in a mole ratio of 1:1:0.2 is continuously fed to the tower and contacted for 5 minutes with hydrogen at 2000 p.s.i. gauge in the catalyst bed. The reaction product (sec-butylurea) is withdrawn from the bottom of the reactor by means of a pressure reducing valve arrangement and fed to a flake dryer. Unreacted methyl ethyl ketone, ammonia and excess hydrogen are removed overhead through the condenser, recompressed and recycled into the system. When the catalyst activity declines, the hydrogen and process streams are shut off and high pressure steam passed through the tower to remove any product coating from the catalyst bed. Following the steam treatment, if desired, the catalyst is reconditioned by reducing with hydrogen gas at 350° C. for 2 hours. After this reconditioning treatment, the catalyst bed is cooled to 110°–140° C. and process operations are resumed. High yields of sec-butylurea are obtained in this manner.

Example 19

Using an arrangement of 3 autoclaves as in Example 17, 510 grams of urea (8.5 moles), 612 grams of methyl ethyl ketone (8.5 moles), and 41.5 grams of ammonia (2.54 moles) are charged to the agitated mixing clave, while 21.3 grams of the catalyst of Example 1 is slurried in 45 milliliters of water and added to the reaction clave. The discharge clave containing 1500 milliliters of water is heated to 100° C. Hydrogen pressure of 250 pounds per square inch gauge is added at room temperature to the mixing clave as well as to the reaction autoclave. The urea, methyl ethyl ketone, ammonia and hydrogen mixture is then heated to 120°–125° C. and transferred at this temperature with additional hydrogen pressure through a steam chased high pressure line to the reactor, containing the catalyst, water and hydrogen at 95°–100° C. Upon completion of the product transfer, the hydrogen pressure in the reaction clave is increased to 1500–1800 pounds per square inch. Hydrogen absorption starts immediately. After 45–60 minutes reaction time at 115°–120° C., the hot reaction mass is transferred under full pressure into the discharge clave. Excess pressure is vented. Reaction by-products such as sec-butylamine and sec-butylalcohol as well as unreacted methyl ethyl ketone are distilled off and recovered. The remaining hot product-water slurry is filtered to separate the catalyst. The filtrate is allowed to cool to room temperature and the solid product is centrifuged, dried and analyzed. The product composition is found to be 94% sec-butylurea, 4.5% di-sec-butylurea and 1% unreacted urea. The product mother liquor is salted and a small second crystal crop is recovered. The total yield of sec-butylurea is 805 grams (81.8%) and of di-sec-butylurea is 55.7 grams (5.6%).

The invention claimed is:

1. The process comprising reacting from about 0.5 to 1.5 moles of urea with one mole of a ketone containing from 3 through 9 carbon atoms and having the following formula:

where R is an alkyl radical containing from 1 through 7 carbon atoms inclusive, $R_1$ in an alkyl radical containing from 1 through 7 carbon atoms inclusive, with the maximum sum of R plus $R_1$ being 8, and where R and $R_1$ can be joined together to form with the carbon of the carbonyl group in the ketone a saturated hydrocarbon ring of from 5 through 6 carbon atoms inclusive in said ring and where said ring can be substituted with a member of the group consisting of hydrogen, methyl, ethyl, propyl and isopropyl; wherein said process is carried out in the presence of about 0.05 to 0.5 mole of ammonia for each mole of said ketone, at a temperature from about 80° to 200° C. and a hydrogen pressure from 500 to 4000 pounds per square inch gauge, in the presence of a hydrogenation catalyst, for a reaction time of less than about 3 hours, to produce excellent yields of the corresponding monoalkylated urea.

2. The process as set forth in claim 1 wherein said ketone is methyl ethyl ketone.

3. The process as set forth in claim 1 wherein said ketone is acetone.

4. The process as set forth in claim 1 wherein said ketone is cyclohexanone.

5. The process as set forth in claim 1 wherein said catalyst is a promoted nickel catalyst.

6. The process as set forth in claim 1 wherein said catalyst is a promoted cobalt catalyst.

7. The process for the preparation of sec-butylurea which comprises reacting one mole of methyl ethyl ketone, 0.5–1.5 moles of urea, in the presence of 0.1–0.5 mole of ammonia and a catalytic amount of a promoted nickel catalyst, at a temperature in the range from 80°–200° C. for 1–60 minutes and at a hydrogen pressure of 500–4000 pounds per square inch gauge.

No references cited.